(12) United States Patent
Baker et al.

(10) Patent No.: US 10,673,509 B2
(45) Date of Patent: *Jun. 2, 2020

(54) EFFICIENT CQI SIGNALING IN MULTI-BEAM MIMO SYSTEMS

(71) Applicant: KONINKLIJKE PHILIPS N.V., Eindhoven (NL)

(72) Inventors: Matthew Peter John Baker, Canterbury (GB); Timothy James Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,908

(22) Filed: Dec. 29, 2017

(65) Prior Publication Data

US 2018/0123672 A1    May 3, 2018

Related U.S. Application Data

(63) Continuation of application No. 14/875,095, filed on Oct. 5, 2015, now Pat. No. 9,859,968, which is a (Continued)

(30) Foreign Application Priority Data

Aug. 21, 2006   (EP) ................... 06119254

(51) Int. Cl.
*H04B 7/06* (2006.01)
*H04L 1/00* (2006.01)
(Continued)

(52) U.S. Cl.
CPC ......... *H04B 7/0632* (2013.01); *H04B 7/0413* (2013.01); *H04B 7/0617* (2013.01);
(Continued)

(58) Field of Classification Search
CPC .. H04B 7/0413; H04B 7/0417; H04B 7/0452; H04B 7/0478; H04B 7/0482;
(Continued)

(56) References Cited

U.S. PATENT DOCUMENTS

| 6,094,418 A | 7/2000 | Soumiya |
| 2004/0014429 A1 | 1/2004 | Guo |

(Continued)

FOREIGN PATENT DOCUMENTS

| WO | 0215432 A1 | 2/2002 |
| WO | 03023995 A1 | 3/2003 |

(Continued)

OTHER PUBLICATIONS

"Physical Channels and Multiplexing in Evolved UTRA Downlink", NTT DoCoMo, NEC, SHARP, 3GPP TSG RAN WG1 #42 on LTE, R1-050707, Sep. 2005.

(Continued)

*Primary Examiner* — Young T Tse

(57) ABSTRACT

The present invention relates to the signaling of channel quality information in a multi-beam transmission system, wherein a plurality of beams are simultaneously transmitted and a plurality of sets of channel quality information are transmitted for controlling independently the transmission rate on the different beams. Determined are beams with a different quality resulting in different effects of errors in the transmissions of the channel quality information for the beams. Said different effects are exploited for reducing a signaling overhead of the channel quality information for the beams.

55 Claims, 4 Drawing Sheets

Figure 1:
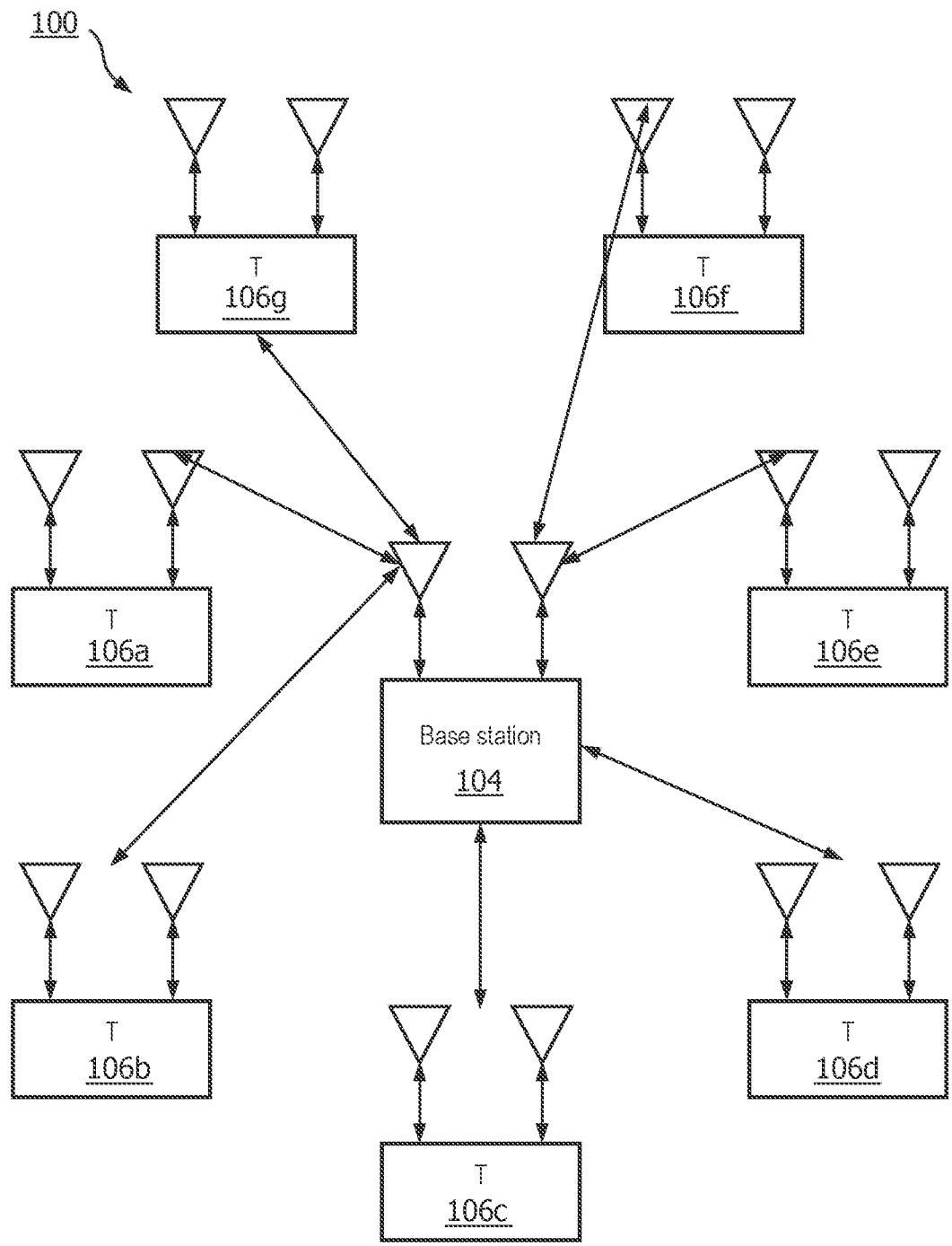

Related U.S. Application Data continuation of application No. 14/055,975, filed on Oct. 17, 2013, now Pat. No. 9,154,200, which is a continuation of application No. 12/438,158, filed as application No. PCT/IB2007/053284 on Aug. 17, 2007, now Pat. No. 8,588,116.

(51) Int. Cl.
*H04L 5/00* (2006.01)
*H04B 7/0413* (2017.01)

(52) U.S. Cl.
CPC ......... *H04B 7/0639* (2013.01); *H04B 7/0641* (2013.01); *H04L 1/0027* (2013.01); *H04L 1/0029* (2013.01); *H04L 5/006* (2013.01); *H04L 1/0002* (2013.01)

(58) Field of Classification Search
CPC .... H04B 7/061; H04B 7/0617; H04B 7/0619; H04B 7/0626; H04B 7/0632; H04B 7/0639; H04B 7/0641; H04B 7/0862; H04B 7/0865; H04B 7/088; H04B 7/0897; H04L 1/0001; H04L 1/0002; H04L 1/0026; H04L 1/0027; H04L 1/0029; H04L 5/006
USPC ............... 375/225, 227, 260, 262, 265, 267; 370/332, 333, 335, 342; 455/500, 501, 455/67.13, 69
See application file for complete search history.

(56) References Cited

U.S. PATENT DOCUMENTS

| | | | |
|---|---|---|---|
| 2004/0042427 A1 | 3/2004 | Hottinen | |
| 2004/0131134 A1* | 7/2004 | Hiroyasu | H01Q 3/2611 375/347 |
| 2005/0064872 A1 | 3/2005 | Osseiran | |
| 2005/0181799 A1* | 8/2005 | Laroia | H04L 5/0007 455/450 |
| 2005/0201296 A1 | 9/2005 | Vannithamby | |
| 2005/0281324 A1 | 12/2005 | Wallen | |
| 2005/0282500 A1 | 12/2005 | Wang | |
| 2006/0023624 A1 | 2/2006 | Han | |
| 2006/0072677 A1 | 4/2006 | Kwak | |
| 2006/0203891 A1* | 9/2006 | Sampath | H04B 7/0417 375/132 |
| 2006/0233131 A1 | 10/2006 | Gore | |
| 2007/0026803 A1 | 2/2007 | Malm | |
| 2007/0298728 A1 | 12/2007 | Imamura | |

FOREIGN PATENT DOCUMENTS

| | | |
|---|---|---|
| WO | 2005091541 A2 | 9/2005 |
| WO | 2006028204 A1 | 3/2006 |
| WO | 2005055507 A1 | 6/2006 |

OTHER PUBLICATIONS

"Description and Link Simulations of MIMO Schemes for OFDMA Based E-UTRA Downlink Evaluation", Qualcomm Europe, 3GPP TSG-RAN WG1 #42, RE-050903, Sep. 2005.

"AMC and HARQ Using Frequency Domain Channel-Dependent Scheduling in MIMO Channel Transmission", NTT DoCoMo, NEC, SHARP, 3GPP TSG RAN WG1 #42 on LTE, R1-050942, Sep. 2, 2005.

* cited by examiner

EFFICIENT CQI SIGNALING IN MULTI-BEAM MIMO SYSTEMS

The present application is a continuation of U.S. patent application Ser. No. 14/875,095, filed on Oct. 5, 2015 (to be issued as U.S. Pat. No. 9,859,968 on Jan. 2, 2018), which is a continuation of U.S. patent application Ser. No. 14/055,975, filed on Oct. 17, 2013, now issued as U.S. Pat. No. 9,154,200, on Oct. 6, 2015, which is a continuation of U.S. patent application Ser. No. 12/438,158, filed on Feb. 20, 2009, now issued as U.S. Pat. No. 8,588,116 on Nov. 19, 2013, which was the National Stage of International Application No. PCT/IB2007/053284 filed on Aug. 17, 2007, which claims priority of European Application Nos. 06119254.8 filed Aug. 21, 2006, and 06119326.4 filed Aug. 22, 2006, each of which are incorporated by reference herein in their entirety.

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. In radio, multiple-input and multiple-output, or MIMO, is a method for multiplying the capacity of a radio link using multiple transmit and receive antennas to exploit multipath propagation. MIMO has become an essential element of wireless communication standards including IEEE 802.11n (Wi-Fi), IEEE 802.11ac (Wi-Fi), HSPA+ (3G), WiMAX (4G), and Long Term Evolution (4G). If the propagation paths between the transmit and receive antennas are linearly independent (i.e., a transmission on one path is not formed as a linear combination of the transmissions on the other paths), which is generally true to at least an extent, then the likelihood of correctly receiving a data transmission increases as the number of antennas increases. Generally, diversity increases and performance improves as the number of transmit and receive antennas increases.

Figure 4:
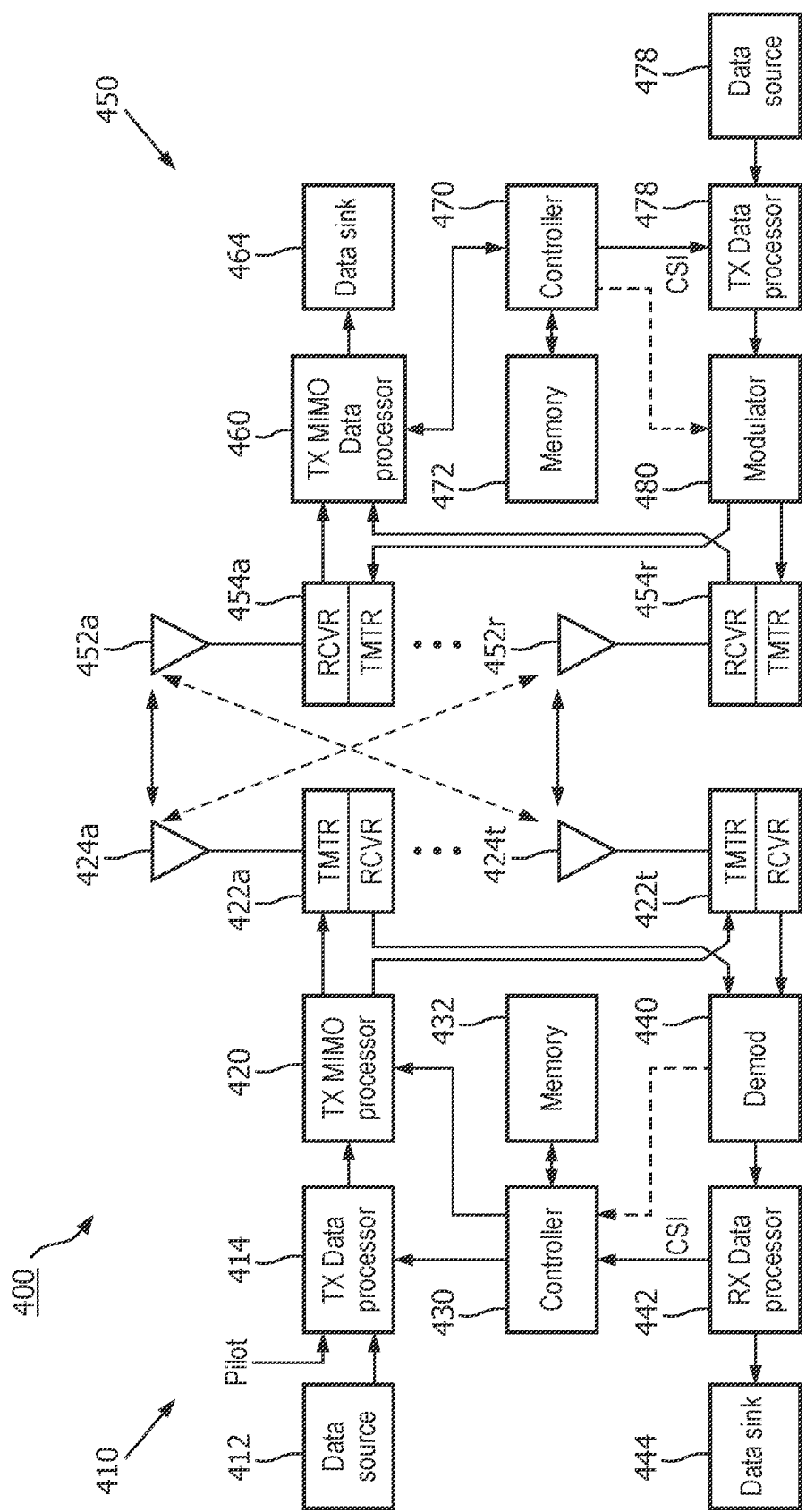

FIG. 4 is a diagram of an embodiment of a conventional multiple-input multiple output (MIMO) communication system that employs multiple ($N_r$) transmit antennas and multiple ($N_R$) receive antennas for data transmission. A MIMO channel formed by the Nr transmit and $N_R$ receive antennas may be decomposed into $N_s$ independent channels, with $N_s \leq \min\{N_T, N_R\}$. Each of the Ns independent channels may also be referred to as a spatial subchannel (or a transmission channel) of the MIMO channel and corresponds to a dimension. The MIMO system can provide improved performance (e.g., increased transmission capacity) if the additional dimensionalities created by the multiple transmit and receive antennas are utilized. At transmitter system 410 traffic data for a number of data streams is provided from a data source 412 to a transmit (TX) data processor 414. In an embodiment, each data stream is transmitted over a respective transmit antenna.

TX data processor 414 formats, codes, and interleaves the traffic data for each data stream based on a particular coding scheme selected for that data stream to provide coded data. The coded data for each data stream may be multiplexed with pilot data using, for example, time division multiplexing (TDM) or code division multiplexing (CDM). The pilot data is typically a known data pattern that is processed in a known manner (if at all), and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by controls provided by a controller 430. The modulation symbols for all data streams are then provided to a TX MTMO processor 420, which may further process the modulation symbols (e.g., for OFDM). TX MTMO processor 420 then provides Nr modulation symbol streams to Nr transmitters (TMTR) 422a through 422n. Certain aspects of the data rate determination and the processing at the transmitter/receiver may be implemented with modules (e.g., procedures, functions, and so on) that perform the functions described herein. The software codes may be stored in a memory unit 432 and executed by controller 430. The memory unit may be implemented within the processor 420 or external to the processor 420, in which case it can be communicatively coupled to the processor 420 via various means as is known in the art.

At receiver system 450, the transmitted modulated signals are received by $N_R$ antennas 452a through 452r, and the received signal from each antenna 452 is provided to a respective receiver (RCVR) 454. Each receiver 454 conditions (e.g., filters, amplifies, and downconverts) a respective received signal, digitizes the conditioned signal to provide samples, and further processes the samples to provide a corresponding "received" symbol stream.

An RX MTMO/data processor 460 then receives and processes the $N_R$ received symbol streams from $N_R$ receivers 454 based on a particular receiver processing technique to provide Nr "detected" symbol streams. The processing by RX MTMO/data processor 460 is described in further detail below. Each detected symbol stream includes symbols that are estimates of the modulation symbols transmitted for the corresponding data stream. RX MTMO/data processor 460 then demodulates, deinterleaves, and decodes each detected symbol stream to recover the traffic data for the data stream. The processing by RX MTMO/data processor 460 is complementary to that performed by TX MTMO processor 420 and TX data processor 414 at transmitter system 410.

RX MTMO processor 460 may derive an estimate of the channel response between the N transmit and NR receive antennas, e.g., based on the pilot multiplexed with the traffic data. The channel response estimate may be used to perform space or space/time processing at the receiver. RX MTMO processor 460 may further estimate the signal-to-noise-and-interference ratios (SNRs) of the detected symbol streams, and possibly other channel characteristics, and provides these quantities to a controller 470. RX MTMO/data processor 460 or controller 470 may further derive an estimate of the "operating" SNR for the system, which is indicative of the conditions of the communication link. Controller 470 then provides channel state information (CSI), which may comprise various types of information regarding the communication link and/or the received data stream. For example, the CSI may comprise only the operating SNR. The CSI is then processed by a TX data processor 478, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to recover the CSI reported by the receiver system. The reported CSI is then provided to controller 430 and used to determine the data rates and coding and modulation schemes to be used for the data streams and (2) generate various controls for TX data processor 414 and TX MTMO processor 420.

Controllers 430 and 470 direct the operation at the transmitter and receiver systems, respectively. Memories 432 and 472 provide storage for program codes and data used by controllers 430 and 470, respectively.

The present invention relates to a method for signaling channel quality information in a multi-beam transmission system, in particular a multi-beam MIMO (multiple-in/multiple-out) system. Moreover, the present invention relates to a computer program product for carrying out the method. Further, the present invention relates to a multi-beam transmission system, in particular a multi-beam MIMO system, wherein a plurality of beams are simultaneously transmitted and a plurality of sets of channel quality information (CQI) are transmitted for controlling independently the transmission rate on the different beams. Still further, the present invention relates to a network element, in particular a node, in a multi-beam transmission system, in particular a multi-beam MIMO system, wherein a plurality of beams are simultaneously transmitted and a plurality of sets of channel quality information are transmitted for controlling independently the transmission rate on the different beams. Still further, the present invention relates to a user equipment, in particular a mobile station, in a multi-beam transmission system, in particular a multi-beam MIMO system, wherein a plurality of beams are simultaneously transmitted and a plurality of sets of channel quality information are transmitted for controlling independently the transmission rate on the different beams. Finally, the present invention relates to a signal for indicating channel quality information in a multi-beam transmission system, in particular a multi-beam MIMO system, wherein a plurality of beams are simultaneously transmitted and a plurality of sets of channel quality information are transmitted for controlling independently the transmission rate on the different beams.

The present invention can be applied in multi-antenna communication systems. In particular, a potential application of the present invention is in the MIMO feature currently being standardized for UMTS (universal mobile telecommunication system) Release 7.

In the third generation partnership project (3GPP) a proposal called D-TxAA is under discussion for UMTS as a way of increasing the peak bit rate. This is derived from an existing closed loop transmit diversity scheme (TxAA mode 1) where the mobile terminal signals to the network complex weights which should be applied to the signals from each of two transmitting antennas. In D-TxAA two different data streams are transmitted using orthogonal weight vectors, wherein a first weight vector is based on those transmitted from the mobile terminal, and a second vector is derived deterministically from the first vector.

For the operation of D-TxAA, the following may be assumed:

Orthogonal pilot channels are transmitted from an antenna of each Node B (which is a logical node responsible for radio transmission and reception in one or more cells to and from an user equipment (UE).

No dedicated (i.e. beam formed) pilots are available (assuming that the fractional dedicated physical channel (F-DPCH) is used, which does not carry pilot bits).

Feedback information (FBI) for the first beam is derived by the user equipment (UE) and transmitted to Node B, indicating the desired beamforming vector.

The first beam is transmitted using a restricted codebook of weight vectors (for example the codebook currently used for TxAA mode 1).

The identity of the antenna weight vector for a first beam is signaled to the UE on the High-Speed Shared Control Channel (HS-SCCH).

The second beam is transmitted using a deterministic phase vector, which is orthonormal to the vector for the first beam.

Channel quality information (CQI) is signaled by the UE to the Node B, enabling the Node B to derive a different rate for each of the two beams.

The CQI indicates the rate (or packet size) which can be transmitted successfully (or with a given probability of success) using a reference power level and code resource (the reference values being known by both the network and the mobile terminal).

The transmissions on the two beams are comprised of separate codewords with potentially different rates.

As the simultaneously transmitted beams in D-TxAA are typically received with different SINR (signal-to-noise ratio where the noise includes both thermal noise and interference) at the UE, each beam can support a correspondingly different rate. This implies that multiple CQI information is required to be signaled to the Node B by each UE. In UMTS Release 5, a single CQI value is comprised of 5 information bits, coded into 20 physical channel bits. For a multiple-beam system, this number of bits would be multiplied by the number of beams if a separate CQI value is indicated for every beam. This can result in a high signaling load.

An object of the present invention is to reduce the CQI signaling load in multi-beam systems.

In order to achieve the above and further objects, in accordance with a first aspect of the present invention, there is provided a method for signaling channel quality information in a multi-beam transmission system, in particular a multi-beam MIMO system, wherein a plurality of beams are simultaneously transmitted and a plurality of sets of channel quality information are transmitted for controlling independently the transmission rate on the different beams, comprising the steps of determining beams with different quality, and exploiting said different qualities for reducing a signaling overhead of the channel quality information for the beams.

In accordance with a second aspect of the present invention, there is provided a computer program for carrying out the method according to the first aspect of the present invention.

In accordance with a third aspect of the present invention, there is provided a multi-beam transmission system, in particular a multi-beam MIMO system, wherein a plurality of beams are simultaneously transmitted and a plurality of sets of channel quality information are transmitted for controlling independently the transmission rate on the different beams, comprising a determining device for determining beams with different quality, and an exploiting device for exploiting said different qualities for reducing a signaling overhead of the channel quality information for the beams.

In accordance with a fourth aspect of the present invention, there is provided a network element, in particular a node, in a multi-beam transmission system, in particular a multi-beam MIMO system, wherein a plurality of beams are simultaneously transmitted and a plurality of sets of channel quality information are transmitted for controlling independently the transmission rate on the different beams, comprising a determining device for determining beams with different quality, and an exploiting device for exploiting said different qualities for reducing a signaling overhead of the channel quality information for the beams.

In accordance with a fifth aspect of the present invention, there is provided a user equipment, in particular a mobile station, in a multi-beam transmission system, in particular a multi-beam MIMO system, wherein a plurality of beams are simultaneously transmitted and a plurality of sets of channel quality information are transmitted for controlling independently the transmission rate on the different beams, comprising a determining device for determining beams with different quality, and an exploiting device for exploiting said different qualities for reducing a signaling overhead of the channel quality information for the beams.

In accordance with a sixth aspect of the present invention, there is provided a signal for indicating channel quality information in a multi-beam transmission system, in particular a multi-beam MIMO system, wherein a plurality of beams are simultaneously transmitted and a plurality of sets of channel quality information are transmitted for controlling independently the transmission rate on the different beams, the signal comprising a reduced overhead of channel quality information for the beams, based on exploiting differences in qualities of the beams.

FIG. 1 is a diagram of a multiple-input multiple-output communication system 100 that employs multiple (Nt) transmit antennas and multiple (Nr) receive antennas for data transmission. The multi-beam MIMO system 100 may be a multiple-access system having one or more base stations (BS) 104 that can concurrently communicate with one or more terminals (T) 106 (only one base station is shown in FIG. 1 for simplicity). The base stations may also be referred to as network elements, or some other terminology, and the terminals may also be referred to as network elements, mobile stations, handsets, remote stations, user equipment, or some other terminology. Each base station 104 employs multiple transmit and receive antennas and represents the multiple-input (MI) for downlink transmission from the base station to the mobile stations. A set of one or more "communicating" terminals 106 collectively represents the multiple-output for downlink transmissions and the multiple-input for uplink transmissions.

For the example shown in FIG. 1, base station 104 concurrently communicates with terminals 106a through 106g (as indicated by the dotted and solid lines) via the multiple antennas available at the base station and the one or more antennas available at each communicating terminal.

For the downlink, the base station 104 employs Nt antennas and each communicating terminal employs 1 or Nr antennas for reception of one or more data streams from the base station 104. In general, Nr can be any integer two or greater. A MIMO channel formed by the Nt transmit antennas and Nr receive antennas may be decomposed into Ns independent channels, with Ns≤min[Nt, Nr]. Each such independent channel may be referred to as a spatial subchannel of the MIMO channel.

Figure 2:
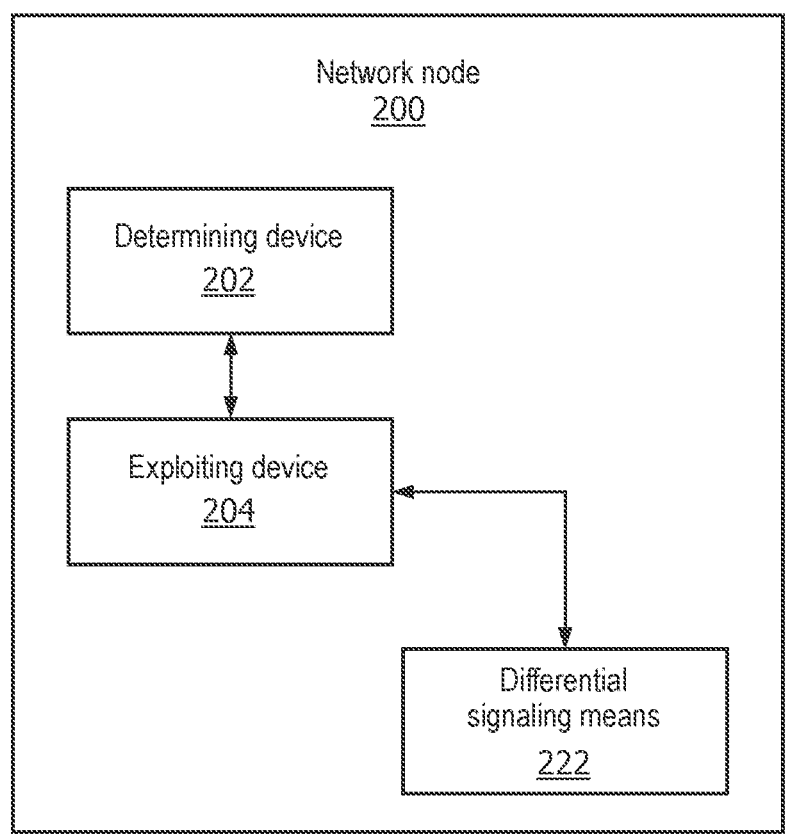

FIG. 2 is a diagram showing an apparatus 200 in a multi-beam transmission system of the invention, in particular, a multi-beam MIMO system, wherein a plurality of beams are simultaneously transmitted and a plurality of sets of channel quality information are transmitted for controlling independently the transmission rate on the different beams, comprising a determining device 210 for determining beams with different quality, and an exploiting device 220 for exploiting said different qualities for reducing a signaling overhead of the channel quality information for the beams by providing differential signaling means 222 for indicating the channel quality information value for the at least one secondary beam, wherein an absolute value of the channel quality information is signaled for the primary beam, and the channel quality information values for the at least one secondary beam are signaled by means of an offset relative to the absolute value of the channel quality information for the primary beam. The apparatus 200 may be referred to as a network element, a node, or some other terminology. In particular, the determining device is adapted to determine a primary beam with a higher quality and at least one secondary beam with a lower quality in the plurality of beams resulting in different effects of errors in the channel quality information transmissions for the secondary beam(s).

Figure 3:
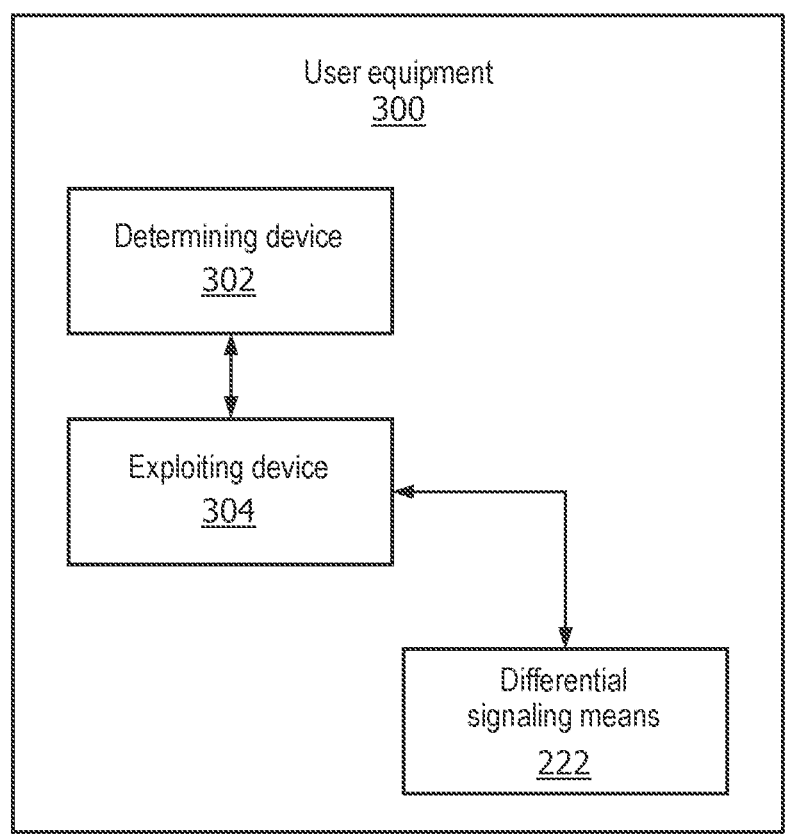

FIG. 3 is a diagram showing an apparatus 300 in a multi-beam transmission System of the invention, in particular, a multi-beam MIMO system, wherein a plurality of beams are simultaneously transmitted and a plurality of sets of channel quality information are transmitted for controlling independently the transmission rate on the different beams, comprising a determining device 310 for determining beams with different quality, and an exploiting device 320 for exploiting said different qualities for reducing a signaling overhead of the channel quality information for the beams by providing differential signaling means 322 for indicating the channel quality information value for the at least one secondary beam, wherein an absolute value of the channel quality information is signaled for the primary beam, and the channel quality information values for the at least one secondary beam are signaled by means of an offset relative to the absolute value of the channel quality information for the primary beam. The apparatus 200 may be referred to as a user equipment, in particular a mobile station, or some other terminology. In particular, the determining device is adapted to determine a primary beam with a higher quality and at least one secondary beam with a lower quality in the plurality of beams resulting in different effects of errors in the channel quality information transmissions for the secondary beam(s).

The present invention leads to a reduction of the CQI signaling load in multi-beam transmission systems. This advantage is achieved in particular by that according to the present invention the different effects of errors in the CQI transmissions for the different beams which effects result from different quality of the beams are exploited for using signaling overhead of CQI for the multiple beams.

Further advantageous embodiments are defined in the dependent claims.

Preferably, said determining device is adapted to determine beams with different quality resulting in different effects of errors in the transmissions of the channel quality information for the beams, and in particular said determining device is adapted to determine a primary beam with a higher quality and at least one secondary beam with a lower quality in the plurality of beams resulting in different effects of errors in the channel quality information transmissions for the secondary beam(s).

There may be a differential signaling device for providing a differential signaling for indicating the channel quality information value for the secondary beam(s). The differential signaling device may be adapted to signal an absolute value of the channel quality information for the primary beam, and the channel quality information values for the secondary beam(s) by means of an offset relative to the value for the primary beam. Further, the differential signaling device may be adapted to derive the offset from an average difference in quality between the respective secondary beam and the primary beam.

Preferably, the exploiting device may be adapted to provide different update rates for the channel quality information for different beams, wherein the differential signaling device may be adapted to signal the offset at a lower update rate than the absolute channel quality information value for the primary beam. Further, the exploiting device may be adapted to provide a lower update rate for the channel quality information transmissions relating to the secondary beam(s) compared to the update rate for the channel quality information transmissions relating to the primary beam. The update rates may be signaled from a network element, in particular a node, to a user equipment, and may be predetermined.

Preferably, the exploiting device is adapted to provide different cut-off thresholds, below which a reporting of channel quality information is not required, for different beams, and in particular the exploiting device is adapted to provide a higher cut-off threshold for the secondary beam(s) than for the primary beam. The cut-off thresholds may be signaled from a network element, in particular a node, to a user equipment, and may be predetermined. Further, scheduled time instants are provided for the user equipment to transmit channel quality information to the network element, and when user equipment estimates that the channel quality for a beam is below the respective cut-off threshold for that beam, the user equipment does not transmit channel quality information at the scheduled time instants until the channel quality is above the respective cut-off threshold. Moreover, according to a preferred embodiment, wherein when the network element does not receive channel quality information at a scheduled time instant it does not make any further transmissions on the respective beam(s) until it receives a different channel quality information value from the user equipment.

Preferably, the exploiting device is adapted to provide different channel quality information quantization granularities for different beams. The exploiting device may be adapted to provide a coarser channel quality information quantization granularity for the secondary beam(s) compared to the channel quality information quantization granularity applied to the channel quality information reports for the primary beam. Further, the exploiting device may be adapted to apply the coarser channel quality information quantization granularity for the secondary beam(s) only to a lower part of the channel quality information range. A network element, in particular a node, may be provided to instruct a user equipment to use different channel quality information quantization granularities for different beams. Still further, the channel quality information quantization granularities may be predetermined.

Preferably, an encoding device is provided for jointly encoding the channel quality information values transmitted for more than one beam into a single codeword for transmission from a user equipment to a network element, in particular a node.

It is recognized that in D-TxAA systems a first beam is typically always of better quality than a second beam as the beam forming weights for the first beam are specifically designed to optimize the signal-to-interference ratio (SIR) of the first beam, while the beam forming weights for the second beam are derived deterministically from the first beam.

In general, multi-beam transmission systems can be considered to be comprised of a primary beam with an optimized SIR and one or more secondary beams with a lower SIR.

Consequently, the effect of errors in the CQI signaling for the secondary beam(s) is considered to be less significant than the effect of errors in the CQI signaling for the primary beam, when considering the total achievable transmission rate over all the beams. This results in a different effect of errors in the CQI transmissions for the secondary beam(s).

Therefore, at first, a primary beam and one or more secondary beams are determined among the multiple beams.

Then, the different effects of errors in the CQI transmissions for the secondary beam(s) are exploited for reducing a signaling overhead of CQI for the multiple beams.

Preferably, the exploiting of the different effects can include one or more of the following three measures or steps:

1. A different (typically lower) update rate is provided for the CQI transmissions relating to at least one secondary beam compared to the update rate for the CQI transmissions relating to the primary beam. These update rates are signaled to the UE by the Node B. In a typical embodiment, a rate of CQI reporting is signaled for the primary beam, and one or more further (advantageously lower) update rates are signaled for one or more secondary beams. In some embodiments, the one or more further update rates may be signaled by means of a divisor of the rate signaled for the primary beam. In a variation of this embodiment, the update rate for CQI transmissions is optionally selected depending upon the rate of change of the channel on each beam.

2. A different (typically higher) cut-off threshold is provided for one or more beams, below which the UE should not report CQI values for the respective beams. In the prior art, an "out-of-range" CQI value is provided for transmission by the UE when the SIR is too low for the UE successfully to decode any of the available transmission formats. However, transmission of such a value continues to contribute to an uplink signaling overhead, even when no data can be received on the downlink. In order to reduce the signaling overhead, the Node B signals to the UE a cut-off CQI level for one or more beams, below which the UE ceases to report CQI for that beam, and the Node B makes no further transmissions on such beams until it receives from the UE another CQI value. In a variation of this embodiment particularly suited to cases where a fixed number of bits is allocated in the uplink signaling channel for CQI reporting purposes, the proportion of the fixed number of uplink bits available for CQI reports is varied according to beam quality, such that when one or more beams have an "out of range" CQI and hence no CQI report is sent, more CQI bits for the "in range" beam(s) may be sent instead to improve their quantization and/or reliability.

3. A different (typically coarser) CQI quantization granularity is provided for at least one secondary beam compared to the CQI quantization granularity applied to the CQI reports for the primary beam. If the rate of the secondary beam(s) is lower and therefore the total rate is less sensitive to errors in the CQI for the secondary beam(s), it is more efficient to coarsen the granularity of the CQI reporting for those beams whereby the number of required signaling bits is reduced. For example, while a 1 dB granularity is typically applied for a primary beam, the Node B might use signaling to instruct the UE to use a coarser granularity (e.g. 2 dB) for one or more secondary beams. Alternatively, the granularities could be predetermined in the specification. In a further embodiment, the coarser granularity for a secondary beam could apply only to a lower part of the CQI range. In a variation of this embodiment, the range of CQI values to be transmitted for the secondary beam(s) may be different from the range of CQI values to be transmitted for the primary beam; the granularity for each beam may optionally then be the same. For example, the total range of possible CQI values could be split into a number of sub-ranges, and a UE would signal only a CQI value within a beam's current sub-range. In an extension of this embodiment, special CQI values could be reserved to indicate switching up or down to the next sub-range of CQI values. Sub-ranges might further be designed to overlap, or be extended or reduced or otherwise adapted by further signaling in order to optimize them for the current beams and channel conditions.

In any of the embodiments, the CQI values transmitted for more than one beam can be jointly encoded into a single codeword for transmission to the Node B.

Differential signaling may be used to indicate the CQI value for one or more secondary beams. For example, an absolute value of CQI may be signaled for the primary beam, and the CQI values for one or more secondary beams may be signaled by means of an offset relative to the value for the primary beam. In particular, the offset can be signaled at a lower update rate than the absolute CQI value for the primary beam. In further embodiments, the offset can be derived from an average difference in quality between the respective secondary beam and the primary beam, wherein the averaging period can be e.g. related to the update rate of the primary beam CQI value, related to the update rate of the offset, predetermined, signaled to the UE by the Node B, or signaled to the Node B by the UE.

Such a difference in CQI may be in terms of a transmission power offset which is required between a secondary beam and the primary beam, assuming that both beams would be transmitted with the same modulation and coding scheme. Alternatively the difference in CQI may be in terms of a transmission power offset required under the assumption that the secondary beam is transmitted with a fixed difference (or ratio) in the data rate relative to the primary beam.

Differential signaling for CQI is typically advantageous if the CQI values of different beams are correlated to a certain extent. In a variation of the embodiments using differential signaling, the UE therefore measures and subtracts the correlated part of the CQI values of the different beams and transmits only a value relating to the non-correlated part of the CQI for secondary beam(s) relative to a primary beam. The period over which the correlation is measured can be selected in a similar way to the averaging period.

Although the invention has been described primarily in relation to transmissions from base stations to mobile terminals, the invention is also applicable to transmissions from mobile terminals to base stations, and between peer nodes.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of radio communication and which may be used instead of or in addition to features already described herein.

What is claimed:

1. A method for signaling channel quality information in a multi-beam transmission system in a network element, wherein a plurality of beams are simultaneously transmitted, wherein one or more sets of channel quality information are transmitted, and wherein the one or more sets of channel quality information are arranged to independently control a transmission rate on at least two beams of the plurality of beams, the method comprising:
   determining a first received signal-to-interference ratio of the at least two beams of the plurality of beams;
   determining a first beam of the at least two beams of the plurality of beams to be a primary beam, wherein the first received signal-to-interference ratio is more than or equal to a received signal-to-interference ratio of any other beam of the at least two beams of the plurality of beams;
   determining at least one other beam of the least two beams of the plurality of beams to be a secondary beam; and
   reducing a signaling overhead of a channel quality information for the at least two beams of the plurality beams by providing different reporting rates for a channel quality information for the primary beam and the secondary beam,
   wherein providing the different reporting rates for the channel quality information comprises providing a second reporting rate for channel quality information transmissions relating to the secondary beam compared to a first reporting rate for channel quality information transmissions relating to the primary beam,
   wherein a differential signaling is used to indicate a channel quality information value for the secondary beam,
   wherein an absolute value of a channel quality information is signaled for the primary beam, and
   wherein channel quality information values for the secondary beam are signaled as an offset relative to the absolute value of the channel quality information signaled for the primary beam.

2. The method according to claim 1, wherein the offset is signaled at a lower reporting rate than the first reporting rate for the absolute value of the channel quality information signaled for the primary beam.

3. A non-transitory computer-readable storage medium, comprising instructions that when executed by a processor perform a method in a network of signaling channel quality information in a multi-beam transmission system, wherein a plurality of beams are simultaneously transmitted, wherein one or more sets of channel quality information are transmitted, and wherein the one or more sets of channel quality information are arranged to independently control a transmission rate on at least two beams of the plurality of beams, the method comprising:
   determining a first received signal-to-interference ratio of the at least two beams of the plurality of beams;
   determining a first beam of the at least two beams of the plurality of beams to be a primary beam, wherein the first received signal-to-interference ratio is more than or equal to a received signal-to-interference ratio of any other beam of the at least two beams of the plurality of beams;
   determining at least one secondary beam of the least two beams of the plurality of beams; and
   reducing a signaling overhead of a channel quality information for the at least two beams of the plurality beams by providing different reporting rates for the channel quality information for the primary beam and the at least one secondary beam, wherein providing the different reporting rates for the channel quality information comprises providing a second reporting rate for channel quality information transmissions relating to the secondary beam compared to providing a first reporting rate for channel quality information transmissions relating to the primary beam, wherein a differential signaling is used to indicate a channel quality information value for the secondary beam, wherein an absolute value of a channel quality information is signaled for the primary beam, and wherein channel quality information values for the secondary beam are signaled as an offset relative to the absolute value of the channel quality information signaled for the primary beam.

4. The non-transitory computer-readable storage medium according to claim 3, wherein the offset is signaled at a lower reporting rate than the first reporting rate for the absolute value of the channel quality information signaled for the primary beam.

5. A network element in a multi-beam transmission system, the network element comprising:

a determining device,
wherein the determining device is arranged to determine a first received signal-to-interference ratio of at least two beams of a plurality of beams in the multi-beam transmission system,
wherein the determining device is further arranged to determine a first beam of the at least two beams of the plurality of beams to be a primary beam,
wherein the first received signal-to-interference ratio is more than or equal to a received signal-to-interference ratio of any other beam of the at least two beams of the plurality of beams, and
wherein the determining device is further arranged to determine at least one other beam of the at least two beams of the plurality of beams to be a secondary beam; and a reducing device, wherein the reducing device is arranged to reduce a signaling overhead of a channel quality information for the at least two beams of the plurality of beams by providing different reporting rates for the channel quality information for the primary beam and for the secondary beam, wherein providing the different reporting rates for the channel quality information comprises providing a second reporting rate for channel quality information transmissions relating to the secondary beam compared to a first reporting rate for channel quality information transmissions relating to the primary beam, wherein a differential signaling is used to indicate a channel quality information value for the secondary beam, wherein an absolute value of a channel quality information is signaled for the primary beam, and wherein channel quality information values for the secondary beam are signaled as an offset relative to the absolute value of the channel quality information signaled for the primary beam.

6. The network element according to claim 5, wherein the offset is signaled at a lower reporting rate than the first reporting rate for the absolute value of the channel quality information signaled for the primary beam.

7. A base station in a multi-beam transmission system, the base station comprising:

a determining device,
wherein the determining device is arranged to determine a first received signal-to-interference ratio of at least two beams of a plurality of beams in the multi-beam transmission system,
wherein the determining device is further arranged to determine a first beam of the at least two beams of the plurality of beams to be a primary beam,
wherein the first received signal-to-interference ratio is more than or equal to a signal-to-interference ratio of any other beam of the at least two beams of the plurality of beams, and
wherein the determining device is further arranged to determine at least one other beam of the at least two beams of the plurality of beams to be a secondary beam; and a reducing device, wherein the reducing device is arranged to reduce a signaling overhead of a channel quality information for the at least two beams of the plurality of beams by providing different reporting rates for the channel quality information for the primary beam and the secondary beam, wherein providing the different reporting rates for a channel quality information comprises providing a second reporting rate for channel quality information transmissions relating to the secondary beam compared to providing a first reporting rate for channel quality information transmissions relating to the primary beam, wherein providing the different reporting rates for the channel quality information comprises providing a lower reporting rate for channel quality information transmissions relating to the secondary beam compared to a reporting rate for channel quality information transmissions relating to the primary beam, wherein a differential signaling is used to indicate a channel quality information value for the secondary beam, and wherein an absolute value of the channel quality information is signaled for the primary beam, and channel quality information values for the secondary beam are signaled as an offset relative to the absolute value of the channel quality information signaled for the primary beam.

8. The base station according to claim 7, wherein the offset is signaled at the first lower reporting rate than the reporting rate for the absolute value of the channel quality information signaled for the primary beam.

9. The base station according to claim 7, wherein the different reporting rates are signaled from a network element to a user equipment.

10. The base station according to claim 7, wherein the different reporting rates are predetermined.

11. The base station according to claim 9,
wherein different cut-off thresholds of channel quality are provided for different respective beams, and
wherein the different cut-off thresholds define a level below which a reporting of a channel quality information is not required.

12. The base station according to claim 11, wherein a higher cut-off threshold is provided for the secondary beam than for the primary beam.

13. The base station according to claim 11,
wherein in a case where the user equipment estimates that a channel quality for a beam of the plurality of beams is below a respective cut-off threshold for that beam, and
wherein the user equipment does not transmit channel quality information at scheduled time instants until the channel quality for the beam is above the respective cut-off threshold.

14. The base station according to claim 11, wherein the different cut-off thresholds are signaled from the network element to the user equipment.

15. The base station according to claim 14, wherein the different cut-off thresholds are predetermined.

16. The base station according to claim 13, wherein the scheduled time instants are provided for the user equipment to transmit channel quality information to the network element.

17. The base station according to claim 16,
wherein in the case where the network element does not receive the channel quality information from the user equipment at a scheduled time instant, and
wherein the network element does not make any further transmissions on different beams of the plurality of beams until the network element receives a different channel quality information value from the user equipment.

18. The base station according to claim 7, wherein different channel quality information quantization granularities are provided for different respective beams of the plurality of beams.

19. The base station according to claim 7, wherein a coarser channel quality information quantization granularity is provided for the secondary beam compared to a channel quality information quantization granularity applied to channel quality information reports for the primary beam.

20. The base station according to claim 19, wherein the coarser channel quality information quantization granularity for the secondary beam only applies to a lower part of a channel quality information range.

21. The base station according to claim 20, wherein a network element instructs a user equipment to use different channel quality information quantization granularities for different beams of the plurality of beams.

22. The base station according to claim 21, wherein the channel quality information quantization granularities are predetermined.

23. The base station according to claim 7, wherein channel quality information values transmitted for more than one beam of the plurality of beams are jointly encoded into a single codeword for transmission from a user equipment to a network element.

24. A user equipment, in a multi-beam transmission system, the user equipment comprising:
a determining device,
wherein the determining device is arranged to determine a first received signal-to-interference ratio of at least two beams of a plurality of beams in the multi-beam transmission system,
wherein the determining device is further arranged to determine a first beam of the at least two beams of the plurality of beams to be a primary beam, wherein the first signal-to-interference ratio is more than or equal to a signal-to-interference ratio of any other beam of the at least two beams of the plurality of beams, and
wherein the determining device is further arranged to determine at least one other beam of the at least two beams of the plurality of beams to be a secondary beam; and
a reducing device, wherein the reducing device is arranged to reduce a signaling overhead of a channel quality information for the at least two beams of the plurality of beams by providing different reporting rates for the channel quality information for the primary beam and the secondary beam,
wherein providing the different reporting rates for the channel quality information comprises providing a second reporting rate for channel quality information transmissions relating to the secondary beam compared to a first reporting rate for channel quality information transmissions relating to the primary beam,
wherein a differential signaling is used to indicate a channel quality information value for the secondary beam, and
wherein an absolute value of a channel quality information is signaled for the primary beam, and channel quality information values for the secondary beam are signaled as an offset relative to the absolute value of the channel quality information signaled for the primary beam.

25. The user equipment according to claim 24, wherein providing the different reporting rates for the channel quality information comprises providing a lower reporting rate for channel quality information transmissions relating to the secondary beam compared to a reporting rate for channel quality information transmissions relating to the primary beam.

26. The user equipment according to claim 24, wherein the offset is derived from an average difference in channel quality between the respective secondary beam and the primary beam.

27. The user equipment according to claim 24, wherein the offset is signaled at a lower reporting rate than a reporting rate for the absolute value of the channel quality information signaled for the primary beam.

28. The user equipment according to claim 27, wherein channel quality information transmissions of the secondary beam are signaled at a lower reporting rate relative to the reporting rate for the channel quality information transmissions of the primary beam.

29. The user equipment according to claim 27, wherein the different reporting rates are signaled from a network element to the user equipment.

30. The user equipment according to claim 29, wherein the different reporting rates are predetermined.

31. The user equipment according to claim 24,
wherein different cut-off thresholds of channel quality are provided for different beams of the plurality of beams, and
wherein the different cut-off thresholds define a level below which a reporting of channel quality information is not required.

32. The user equipment according to claim 31, wherein a higher cut-off threshold is provided for the secondary beam than for the primary beam.

33. The user equipment according to claim 32,
wherein in the case where the user equipment estimates that a channel quality for a beam is below a respective cut-off threshold for that beam, and wherein the user equipment does not transmit the channel quality information at scheduled time instants until the channel quality for the beam is above the respective cut-off threshold.

34. The user equipment according to claim 33, wherein different cut-off thresholds are signaled from a network element to the user equipment.

35. The user equipment according to claim 34, wherein the different cut-off thresholds are predetermined.

36. The user equipment according to claim 33, wherein the scheduled time instants are provided for the user equipment to transmit channel quality information to a network element.

37. The user equipment according to claim 33,
wherein in the case where a network element does not receive the channel quality information from the user equipment at a scheduled time instant, and
wherein the network element does not make any further transmissions on different beams of the plurality of beams, until the network element receives a different channel quality information value from the user equipment.

38. The user equipment according to claim 24, wherein different channel quality information quantization granularities are provided for different respective beams of the plurality of beams.

39. The user equipment according to claim 24, wherein a coarser channel quality information quantization granularity is provided for the secondary beam compared to a channel quality information quantization granularity applied to channel quality information reports for the primary beam.

40. The user equipment according to claim 39, wherein the coarser channel quality information quantization granularity for the secondary beam only applies to a lower part of a channel quality information range.

41. The user equipment according to claim 39, wherein a network element instructs the user equipment to use different respective channel quality information quantization granularities for different beams of the plurality of beams.

42. The user equipment according to claim 41, wherein the channel quality information quantization granularities are predetermined.

43. The user equipment according to claim 24, wherein channel quality information values transmitted for more than one beam of the plurality of beams are jointly encoded into a single codeword for transmission from the user equipment to a network element.

44. A method for signaling channel quality information in a multi-beam transmission system, wherein a plurality of beams are simultaneously transmitted, wherein a plurality of sets of channel quality information are transmitted, and wherein the plurality of sets of channel quality information are arranged to independently control a transmission rate on at least two beams of the plurality of beams, the method comprising:
Determining a primary beam and at least one secondary beam from the plurality of beams, wherein the channel quality of the primary beam is higher than the channel quality of the at least one secondary beam; and
providing a differential signaling relative to the primary beam,
wherein the differential signaling indicates a channel quality information value for the at least one secondary beam,
wherein an absolute value of a channel quality information is signaled for the primary beam, and
wherein channel quality information values for the at least one secondary beam are signaled by means of an offset relative to the absolute value of the channel quality information signaled for the primary beam.

45. The method according to claim 44, wherein the offset is signaled at a lower update rate than the absolute value of the channel quality information signaled for the primary beam.

46. The method according to claim 44, wherein a lower update rate for channel quality information transmissions relating to the at least one secondary beam is compared to an update rate for the channel quality information transmissions relating to the primary beam.

47. The method according to claim 44,
wherein different cut-off thresholds of channel quality are provided for different respective beams, the different cut-off thresholds defining a level below which a reporting of a channel quality information is not required, and
wherein a higher cut-off threshold is provided for the at least one secondary beam than for the primary beam.

48. The method according to claim 47,
wherein the different cut-off thresholds are signaled from a network element to a user equipment,
wherein scheduled time instants are provided for the user equipment to transmit channel quality information to the network element,
wherein in the case where the user equipment estimates that a channel quality for a beam is below the respective cut-off threshold for that beam, and
wherein the user equipment does not transmit a channel quality information at the scheduled time instants until the channel quality is above the respective cut-off threshold for that beam.

49. The method according to claim 47,
wherein the different cut-off thresholds are signaled from a network element to a user equipment,
wherein in the case where the network element does not receive channel quality information from the user equipment for a beam at a scheduled time instant, and
wherein the network element does not make any further transmissions for the beam until the network element receives a different channel quality information value from the user equipment.

50. The method according to claim 44, wherein a coarser channel quality information quantization granularity is provided for the at least one secondary beam compared to a channel quality information quantization granularity applied to the channel quality information reports for the primary beam.

51. A computer program product comprising a non-transitory statutory computer readable medium comprising computer instructions by a processor for carrying out a method for signaling channel quality information in a multi-beam transmission system, wherein a plurality of beams are simultaneously transmitted, wherein a plurality of sets of channel quality information are transmitted, and wherein the plurality of sets of channel quality information are arranged to independently control a transmission rate on at least two beams of the plurality of beams, the method comprising:
Determining a primary beam and at least one secondary beam from the plurality of beams, wherein the channel quality of the primary beam is higher than the channel quality of the at least one secondary beam; and
providing a differential signaling relative to the primary beam, wherein the differential signaling indicates a channel quality information value for the at least one secondary beam, wherein an absolute value of the channel quality information is signaled for the primary beam, and wherein channel quality information values for the at least one secondary beam are signaled by means of an offset relative to the absolute value of the channel quality information signaled for the primary beam.

52. A multi-beam transmission system, wherein a plurality of beams are simultaneously transmitted, wherein a plurality of sets of channel quality information are transmitted, and wherein the plurality of sets of channel quality information are arranged to independently control a transmission rate on different beams from among the plurality of beams to be transmitted, the multi-beam transmission system comprising:

a determining device for determining in the plurality of beams, a primary beam and at least one secondary beam,
  wherein the channel quality of the primary beam is higher than the channel quality of the at least one secondary beam, and
  wherein errors in channel quality information transmissions for the at least one secondary beam are less significant than effects of errors in the channel quality information for the primary beam; and an exploiting device, wherein the exploiting device is arranged to reduce a signaling overhead of a channel quality information for the plurality of beams by providing differential signaling,
  wherein the differential signaling indicates a channel quality information value for the at least one secondary beam,
  wherein an absolute value of a channel quality information is signaled for the primary beam, and
  wherein channel quality information values for the at least one secondary beam are signaled using an offset relative to the absolute value of the channel quality information signaled for the primary beam.

53. A network element for the multi-beam transmission system according to claim 52, wherein the network element comprises the determining device and the exploiting device.

54. A base station including the network element according to claim 53.

55. A user equipment for the multi-beam transmission system according to claim 53, wherein different channel quality information values are signaled from the network element to the user equipment.

* * * * *